US008542460B2

(12) United States Patent
Biskeborn et al.

(10) Patent No.: US 8,542,460 B2
(45) Date of Patent: Sep. 24, 2013

(54) HEAD FOR TAPE DRIVE WITH TRANSVERSELY VARYING CONTOUR

(75) Inventors: Robert Glenn Biskeborn, Hollister, CA (US); Wayne Isami Imaino, San Jose, CA (US); Calvin Shyhjong Lo, Saratoga, CA (US); Gary Miles McClelland, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 12/047,116

(22) Filed: Mar. 12, 2008

(65) Prior Publication Data
US 2009/0231757 A1 Sep. 17, 2009

(51) Int. Cl.
*G11B 5/29* (2006.01)
*G11B 5/265* (2006.01)
*G11B 5/187* (2006.01)

(52) U.S. Cl.
USPC .......................................... 360/122; 360/121

(58) Field of Classification Search
USPC .................... 360/121, 122, 221, 231
See application file for complete search history.

(56) References Cited

U.S. PATENT DOCUMENTS

| 4,423,450 A | 12/1983 | Hamilton |
| 4,439,793 A | 3/1984 | Nater |
| 4,956,737 A | 9/1990 | Brock ............................ 360/122 |
| 5,289,328 A | 2/1994 | Saliba |
| 5,452,165 A | 9/1995 | Chen et al. |
| 5,475,553 A * | 12/1995 | Saliba ............................ 360/122 |
| 5,862,014 A | 1/1999 | Nute |
| 5,883,770 A * | 3/1999 | Biskeborn et al. ........ 360/130.21 |
| 6,038,108 A | 3/2000 | Dee et al. |
| 6,118,626 A * | 9/2000 | Muftu et al. ................... 360/122 |
| 6,122,147 A | 9/2000 | Fahimi et al. .................. 360/221 |
| 6,301,051 B1 | 10/2001 | Sankur |
| 6,350,178 B2 | 2/2002 | Weiss et al. ...................... 451/41 |
| 6,433,959 B1 * | 8/2002 | Lakshmikumaran et al. 360/122 |
| 6,534,221 B2 | 3/2003 | Lee et al. |
| 6,606,219 B2 * | 8/2003 | Lam .............................. 360/129 |
| 6,624,960 B1 | 9/2003 | Langiano et al. |

(Continued)

FOREIGN PATENT DOCUMENTS

DE 3318902 A1 11/1984
WO 03/105133 A1 12/2003

OTHER PUBLICATIONS

U.S. Appl. No. 13/117,013, filed May 26, 2011.

(Continued)

*Primary Examiner* — Wayne Young
*Assistant Examiner* — Adam B Dravininkas
(74) *Attorney, Agent, or Firm* — Zilka-Kotab, PC (57) ABSTRACT

A system comprises a head having a tape bearing surface and an array of transducers in the tape bearing surface, the transducers being selected from a group consisting of readers, writers and servo readers, a length of the array being defined between outer transducers thereof, the head having a feature that induces formation of a larger spacing between a tape and portions of the tape bearing surface positioned laterally to the array in a direction about perpendicular to a direction of tape travel thereacross than between the tape and a contiguous portion of the tape bearing surface wherein the feature has a continuous length that is at least as long as the plurality of transducers, wherein the feature has a continuous length that is at least as long as the plurality of transducers.

18 Claims, 10 Drawing Sheets

(56) References Cited

U.S. PATENT DOCUMENTS

| | | | |
|---|---|---|---|
| 6,690,542 | B1 | 2/2004 | Wang |
| 6,972,931 | B2 | 12/2005 | Rudi et al. |
| 7,008,737 | B2 | 3/2006 | Morales et al. |
| 7,209,324 | B2 | 4/2007 | Brock et al. |
| 7,239,465 | B1 | 7/2007 | Watson et al. |
| 7,271,983 | B2 | 9/2007 | Saliba |
| 7,359,156 | B2 | 4/2008 | Biskeborn et al. |
| 7,414,811 | B2 | 8/2008 | Biskeborn |
| 7,467,757 | B2 | 12/2008 | Biskeborn et al. |
| 7,585,596 | B1 | 9/2009 | Johnson et al. |
| 7,646,565 | B2 | 1/2010 | Biskeborn et al. |
| 7,656,602 | B2 | 2/2010 | Iben et al. |
| 7,660,072 | B2 | 2/2010 | Biskeborn et al. |
| 7,724,465 | B2 | 5/2010 | Koeppe |
| 7,751,154 | B2 | 7/2010 | Wu |
| 8,373,944 | B2 | 2/2013 | Biskeborn |
| 2002/0018964 | A1 | 2/2002 | Jerominek |
| 2003/0076631 | A1 | 4/2003 | Torline et al. |
| 2003/0154908 | A1 | 8/2003 | Webber et al. |
| 2004/0228034 | A1* | 11/2004 | Nakao et al. ............. 360/130.21 |
| 2005/0053844 | A1 | 3/2005 | Wu |
| 2005/0207062 | A1 | 9/2005 | Johnson ................... 360/130.21 |
| 2005/0284207 | A1* | 12/2005 | Biskeborn et al. .................. 73/7 |
| 2006/0232884 | A1 | 10/2006 | Biskeborn .................... 360/129 |
| 2007/0183091 | A1* | 8/2007 | Saliba .......................... 360/122 |
| 2008/0170328 | A1* | 7/2008 | Kawakami et al. ........... 360/122 |
| 2008/0218903 | A1 | 9/2008 | Biskeborn |
| 2009/0189302 | A1 | 7/2009 | Fujita et al. |
| 2009/0231756 | A1 | 9/2009 | Koeppe |
| 2009/0231757 | A1 | 9/2009 | Biskeborn et al. |
| 2009/0268343 | A1 | 10/2009 | Biskeborn et al. |
| 2010/0053810 | A1 | 3/2010 | Biskeborn et al. |
| 2012/0300338 | A1 | 11/2012 | Biskeborn |

OTHER PUBLICATIONS

Dee, "Magnetic Tape Recording Technology and Devices," 1998 IEEE, 1998 Int'l NonVolatile Memory Technology Conference, pp. 55-64.

U.S. Appl. No. 12/831,149, filed Jul. 6, 2010.

U.S. Appl. No. 13/009,758, filed Jan. 19, 2011.

Notice of Allowance and Fee(s) Due from U.S. Appl. No. 13/117,013 dated Oct. 9, 2012.

Restriction/Election Requirement from U.S. Appl. No. 12/831,149 dated Dec. 3, 2012.

Non-Final Office Action from U.S. Appl. No. 12/831,149 dated Dec. 21, 2012.

Restriction/Election Requirement from U.S. Appl. No. 13/009,758 dated Jan. 22, 2013.

* cited by examiner

HEAD FOR TAPE DRIVE WITH TRANSVERSELY VARYING CONTOUR

FIELD OF THE INVENTION

The present invention relates to data storage systems, and more particularly, this invention relates to heads having a tape bearing surface and an array of transducers.

BACKGROUND OF THE INVENTION

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement tends to cause formation of a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are close to the tape to effect efficient signal transfer, and so that the read element is close to the tape to provide effective coupling of the magnetic field from the tape to the read element.

However, this close spacing has resulted in various tribological issues becoming more pronounced, among them, tape/head stiction and running friction. Particularly, as the linear density of magnetic tape recording increases, the magnetic spacing must be reduced, requiring smoother heads and tapes. These may be associated with increased startup friction (stiction), increased running friction, and more instantaneous speed variations (ISVs). In addition, tape-head wear may limit tape lifetime, and contact-generated debris can adhere to the head, increasing the magnetic spacing.

This friction/stiction problem can be alleviated by roughening the air bearing, but such roughening may increase tape wear. Furthermore, this roughening may be filled by tape debris or worn away by the tape. Alternatively, to alleviate stiction, a mechanism may be used to lift off the tape when stopped, but the running friction and ISVs may remain. In some cases, a mechanism to reduce friction may be utilized. In this case, the reading and writing portion of the head is surrounded with a contoured surface. This approach reduces both static and running friction, but requires some assembly.

Head-media stiction has also been addressed by making the media rougher, but, as alluded to above, this may adversely affect the signal-to-noise ratio and thus detection capability and ultimately areal density. Again, as the linear density of magnetic tape recording increases, the magnetic spacing must be reduced, requiring smoother heads and tapes.

SUMMARY OF THE INVENTION

A system in one embodiment comprises a head having a tape bearing surface and an array of transducers in the tape bearing surface, the transducers being selected from a group consisting of readers, writers and servo readers, a length of the array being defined between outer transducers thereof; the head having a feature that induces formation of a larger spacing between a tape and portions of the tape bearing surface positioned laterally to the array in a direction about perpendicular to a direction of tape travel thereacross than between the tape and a contiguous portion of the tape bearing surface spanning a plurality of the transducers, wherein the feature has a continuous length that is at least as long as the plurality of transducers.

A tape head according to another embodiment comprises a tape bearing surface; an array of transducers in the tape bearing surface, the transducers being selected from a group consisting of readers, writers and servo readers, a length of the array being defined between outer transducers thereof; an edge of the tape bearing surface having a skiving edge; and outer portions flanking the skiving edge, the outer portions inducing formation of an air bearing between the tape and the tape bearing surface over areas of the tape bearing surface therebehind about parallel to a direction of tape travel thereacross, the skiving edge promoting contact between the tape and the array.

A method according to another embodiment comprises passing a magnetic tape across a head; and inducing formation of a larger spacing between the tape and portions of a tape bearing surface of the head positioned laterally to an array of transducers in a direction about perpendicular to a direction of tape travel thereacross than between the tape and a contiguous portion of the tape bearing surface spanning a plurality of the transducers.

Any of these embodiments may be implemented in a magnetic data storage system such as a tape drive system, which may include a magnetic head as recited above, a drive mechanism for passing a magnetic medium (e.g., recording tape) over the magnetic head, and a controller electrically coupled to the magnetic head.

Other aspects, advantages and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a tape-based data storage system includes a head having a tape bearing surface and an array of transducers in the tape bearing surface, the transducers being selected from a group consisting of readers, writers and servo readers, a length of the array being defined between outer transducers thereof, wherein the head induces formation of a larger spacing between a tape and portions of the tape bearing surface positioned laterally to the array in a direction about perpendicular to a direction of tape travel thereacross than between the tape and a contiguous portion of the tape bearing surface spanning a plurality of the transducers, wherein the feature has a continuous length that is at least as long as the plurality of transducers. Note that the plurality of transducers may be a subset of the array, e.g., two or more of the transducers in the array, or the entire array.

In another general embodiment, a tape head includes a tape bearing surface, an array of transducers in the tape bearing surface, the transducers being selected from a group consisting of readers, writers and servo readers, a length of the array being defined between outer transducers thereof, an edge of the tape bearing surface having a skiving edge and outer portions flanking the skiving edge, the outer portions inducing formation of an air bearing between the tape and the tape bearing surface over areas of the tape bearing surface therebehind about parallel to a direction of tape travel thereacross, the skiving edge promoting contact between the tape and the array.

In another general embodiment, a method is provided including passing a magnetic tape across a head and inducing formation of a larger spacing between the tape and portions of a tape bearing surface of the head positioned laterally to an array of transducers in a direction about perpendicular to a direction of tape travel thereacross than between the tape and a contiguous portion of the tape bearing surface spanning a plurality of the transducers.

Figure 1:
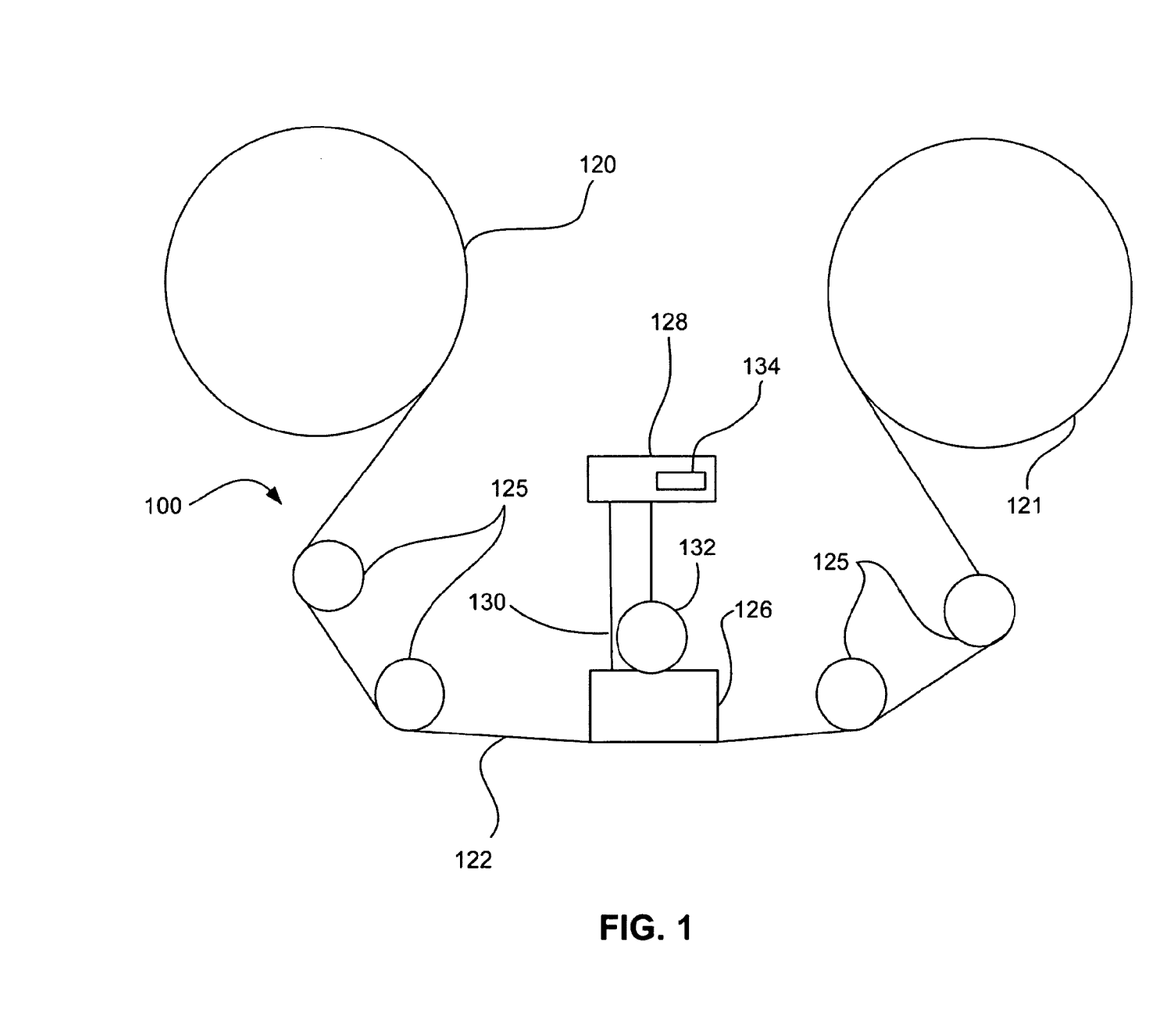
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
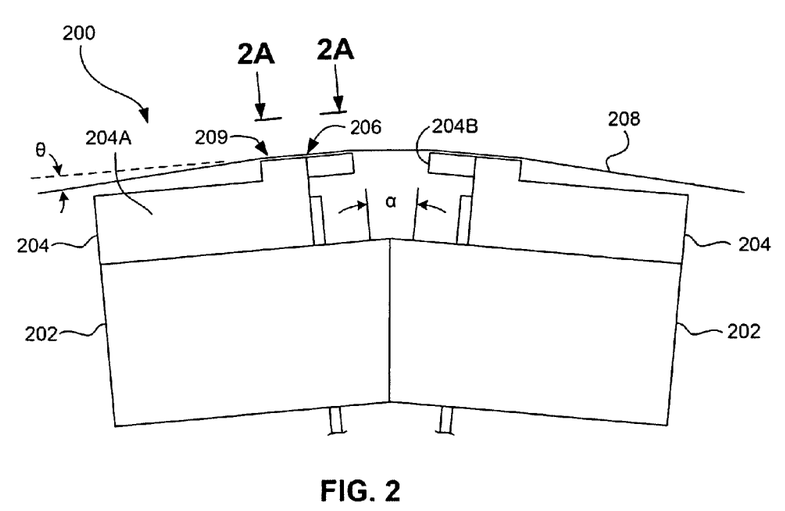
FIG. 2 illustrates a side view of a flat-lapped, bi-directional, two-module c tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap 206 comprising readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
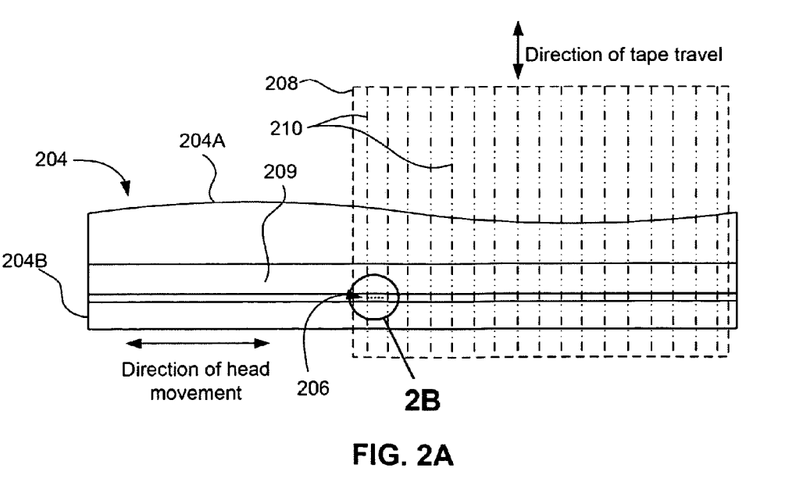
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands. Note that the tape bearing surface need not be flat, and may have some curvature along at least a portion thereof.

In this example, the tape 208 includes 12-22 data bands, e.g., with 16 data bands and 17 servo tracks 210, as shown in FIG. 2A on a one-half inch wide tape 208. The data bands are defined between servo tracks 210. Each data band may include a number of data tracks, for example 96 data tracks (not shown). During read/write operations, the elements 206 are positioned within one of the data bands. Outer readers, sometimes called servo readers, read the servo tracks 210. The servo signals are in turn used to keep the elements 206 aligned with a particular set of tracks during the read/write operations.

Figure 2B:
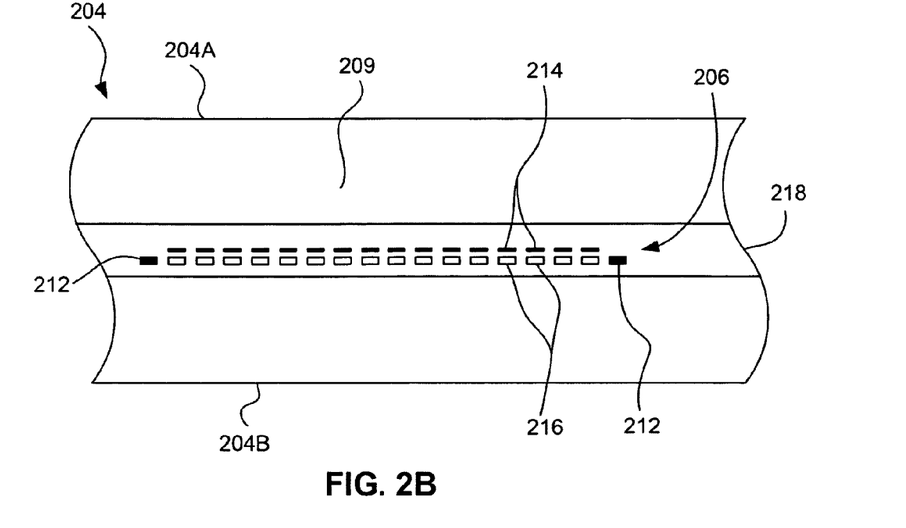
FIG. 2B is a detailed view taken from Circle 2B of FIG. 2A.

FIG. 2B depicts a plurality of read and/or write elements 206 formed in a gap 218 on the module 204 in Circle 2B of FIG. 2A. As shown, the array of elements 206 includes, for example, 16 writers 214, 16 readers 216 and two servo readers 212, though the number of elements may vary. Illustrative embodiments include 8, 16, 32, and 40 elements per array 206. A preferred embodiment includes 32 readers per array and/or 32 writers per array. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of elements 206 may be readers or writers only, and the arrays may contain one or more servo readers 212. As noted by considering FIGS. 2 and 2A-B together, each module 204 may include a complementary set of elements 206 for such things as bi-directional reading and writing, read-while-write capability, backward compatibility, etc.

Figure 2C:
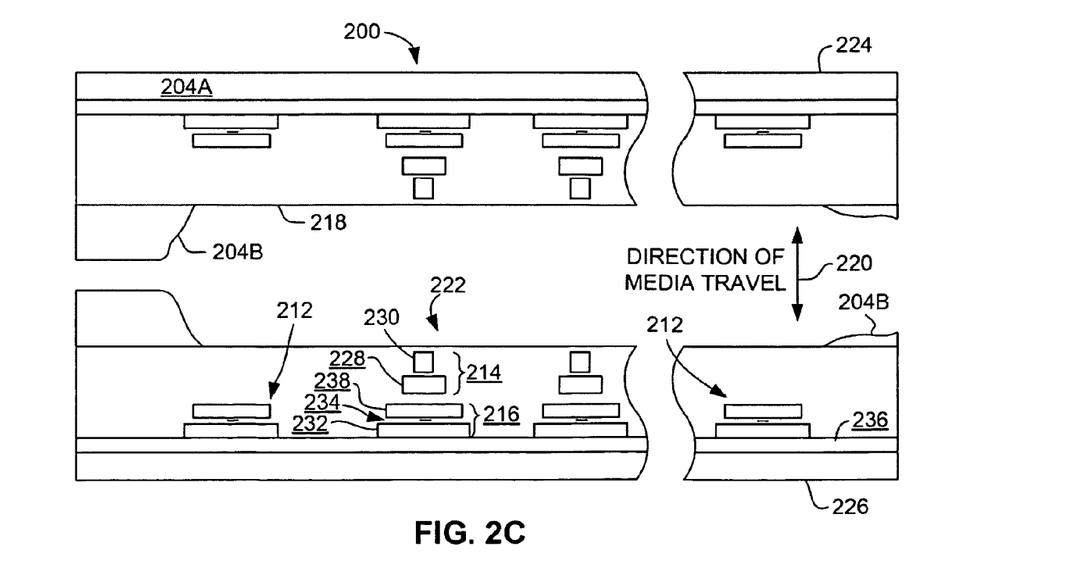
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3A:
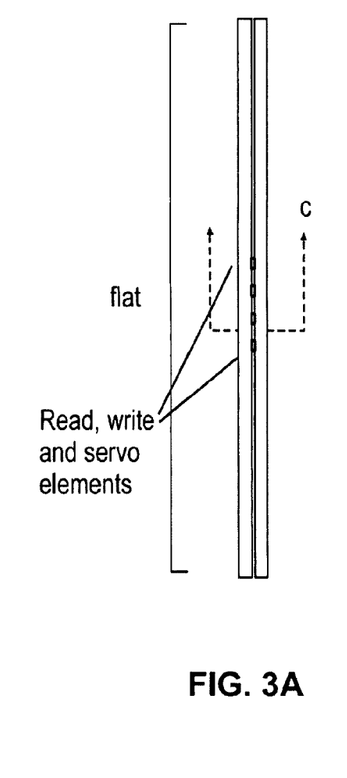
FIG. 3A shows a tape-based data storage system, in accordance with one embodiment.
Figure 3B:
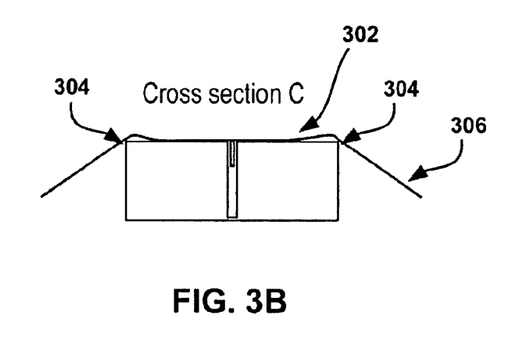
FIG. 3B shows a cross section of the tape-based data storage system of FIG. 3A, in accordance with one embodiment.

In modern linear data recording, the magnetic tape (e.g. a tape approximately 12 mm wide) passes over a head structure including read/write elements localized to a much shorter region, about 3 mm across, illustrated in FIGS. 3A and 3B. As shown, the tape bearing surface 302 includes a sharp edge 304 where a tape 306 first touches the head. This "skiving" edge serves to prevent air from being drawn into the head-tape gap, so that atmospheric pressure pushes the tape into contact with the read/write elements. Even a small amount of roundness or slope at the incoming edge may generate an air bearing, separating the tape from the head and rendering high density recording impossible. In some head designs, before the tape passes over this head portion, the tape passes over an additional separated portion, or "outrigger," which positions the tape to approach the skiving edge at the correct wrap angle.

As mentioned above, future systems of high areal density will likely implement smoother heads and tapes. However, this causes increased startup friction (stiction), increased running friction, and more instantaneous speed variations (ISVs). In addition, tape-head wear may limit tape lifetime, and contact-generated debris can adhere to the head, increasing the magnetic spacing.

Figure 4A:
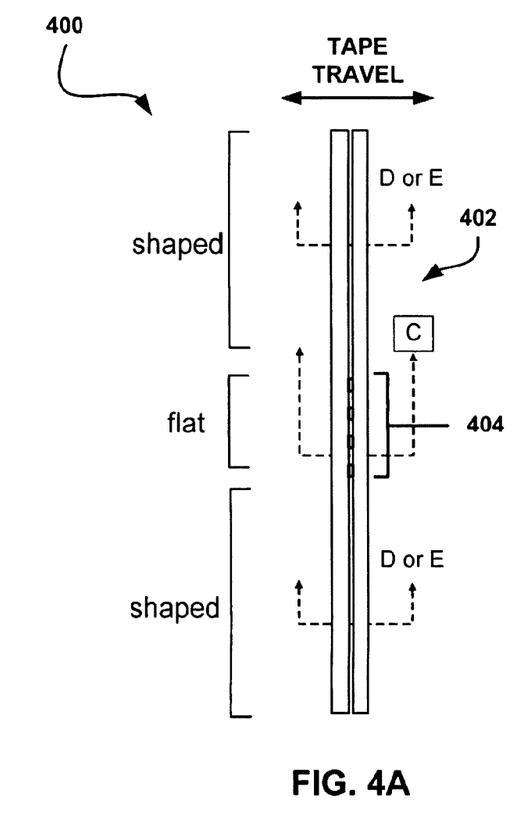
FIG. 4A shows a tape-based data storage system, in accordance with one embodiment.

FIG. 4A shows a tape-based data storage system 400, in accordance with one embodiment. As shown, the system 400 includes a head 402 (a module of which is shown in FIG. 4A) having a tape bearing surface and an array of transducers 404 in the tape bearing surface, the transducers being selected from a group consisting of readers, writers and servo readers. Furthermore, a length of the array 404 is defined between outer ends of the outer transducers thereof, and may or may not include any servo readers present. Thus, as an option, the outer transducers may be the servo readers. In other various embodiments, the outer transducers may be any transducer used during a given reading or writing operation. In this case, the outer transducers may not necessarily be the outermost transducers present on the head 402.

Figure 4B:
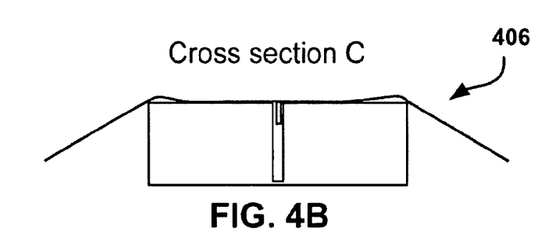
FIGS. 4B-4D show cross sections of the tape-based data storage system of FIG. 4A, in accordance with one embodiment.
Figure 4C:
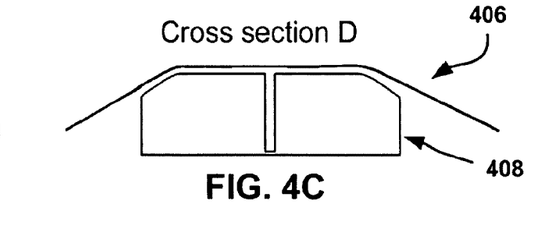
Figure 4D:
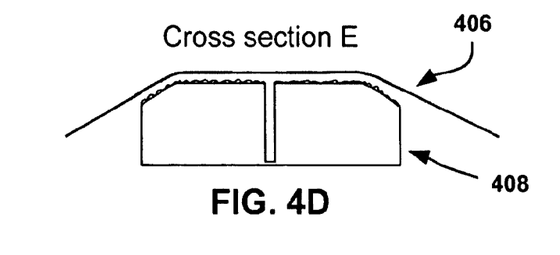

In operation, the head 402 induces a formation of a larger spacing between a tape 406 and portions of the tape bearing surface 408 positioned laterally to the array in a direction about perpendicular to a direction of tape travel thereacross than between the tape 406 and a contiguous portion of the tape bearing surface spanning across multiple transducers in the array, as shown in FIGS. 4B-4D. For example, the region with the closer spacing may extend across two or more of the transducers in the array. In another approach, the region with the closer spacing may extend at least half way along the length of the array 404 in front of or behind the array 404 relative to the direction of tape travel thereacross. In one embodiment, the larger spacing may be formed by an air bearing between the tape 406 and the portions of the tape bearing surface 408 positioned laterally to the array 404. Furthermore, the system 400 may be configured such that no air bearing is formed over a majority of the array 404 (e.g. see FIG. 4B).

As an option, an edge of the tape bearing surface may extend about perpendicular to a direction of tape travel thereacross, the edge having a continuous skiving edge in front of the array 404, as shown in FIGS. 4B-4D. In one approach, the skiving edge has a continuous, uninterrupted length that is at least as long as a plurality of the transducers in the array as measured between outer ends of the transducers. In one embodiment, the skiving edge may have a length that is greater than about 50% of the array length. Additionally, the skiving edge may promote a contiguous area of contact between the tape 406 and the array 404 along a majority of a length of the array 404 (e.g. see FIG. 4B). As an option, the contiguous portion may extend beyond the length of the array 404.

Figure 5A:
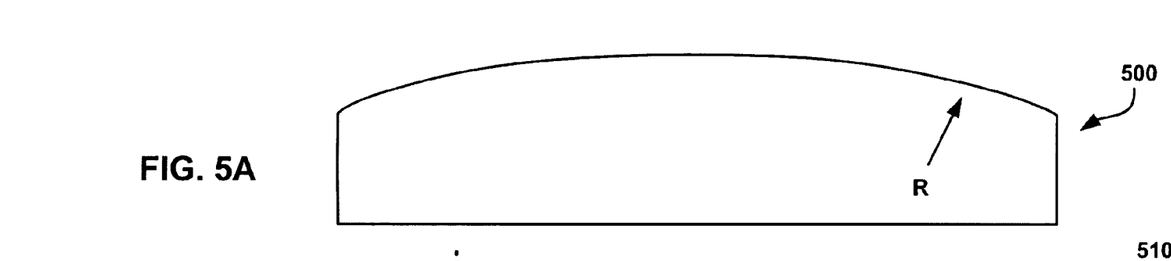
FIG. 5A shows a magnetic head structure, in accordance with one embodiment.
Figure 5B:
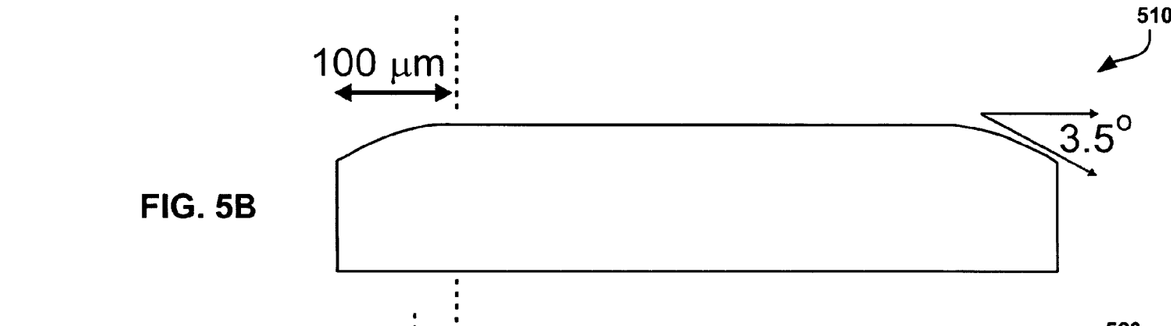
FIG. 5B shows a magnetic head structure, in accordance with one embodiment.
Figure 5C:
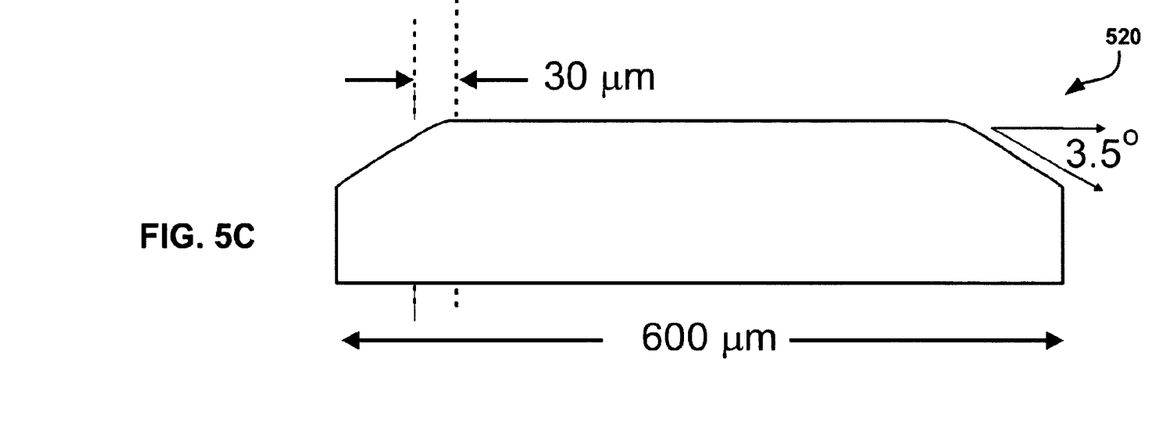
FIG. 5C shows a magnetic head structure, in accordance with one embodiment.

In another embodiment, outer portions of the edge of the tape bearing surface flanking the skiving edge may have a shape adapted for inducing formation of an air bearing between the tape and the tape bearing surface therebehind (e.g. see FIGS. 4C and 4D). For example, the outer portions of the edge of the tape bearing surface have a beveled shape as shown in FIG. 5C. Additionally, the outer portions of the edge of the tape bearing surface may have a rounded shape, as shown in FIGS. 5A and 5B. Of course, however, the portions of the edge flanking the skiving edge may have any shape that induces an air bearing, such as, but not limited to, a curved shape, an angled shape, a tiered shape, and/or any shape that induces an air bearing.

As an option, the tape bearing surface may be predominantly rounded. For example, 50% to 100% of the tape bearing surface may be rounded. In still another embodiment, the tape bearing surface may be predominantly planar or coplanar. For example, 50% to 100% of the tape bearing surface may be about planar or coplanar.

In one embodiment, the portions of the tape bearing surface positioned laterally to the array 404 may be rough, as shown in FIG. 4D. In the context of the present description, rough refers to any deviation from planar and smooth. For example, in various embodiments, the portions of the tape bearing surface positioned laterally to the array may be textured, bumped, roughened in a traditional sense, ridged, laser etched, wavy, discontinuous, and/or any other periodic and/or random deviation from smooth.

In one embodiment, the peak height may be approximately 30-200 nm with respect to the average taken over a region of 10 μm×10 μm. In this case, the surface finish may be chosen to give a small real contact area, but smooth enough not to cause excessive tape wear. Furthermore, the depth may be large enough not to be worn away during contact, but small enough not to protrude through the air bearing.

In this way, only the portion where the tape 406 contacts the surface will generate significant running friction. For example if the magnetic elements span a length of only about ¼ of the width of the tape 406, the running friction will be reduced by about a factor of four.

Numerical solutions of beam bending and Reynolds air flow equations for the air-bearing indicate that an air bearing may be formed from a wide variety of head shapes. FIG. 5A shows a profile of a magnetic head structure 500, in accordance with one embodiment. In this case, the head 502 has a length of L=0.6 mm with a cylindrical surface profile. For a radii of R=2.5 to 10 mm, a tape tension of 0.7 N, a tape velocity between 2 and 12 m/s, and a stiffness of 1-10 mg/μm, as defined in the LTO (Linear Tape-Open) tape specifications, the head structure 500 supports air bearings. Furthermore, the distance of closest approach of the tape to the head ranges from 0.1 to 2 μm, as a function of these parameters.

FIGS. 5B and 5C show profiles of magnetic head structures 510 and 520, in accordance with another embodiment. As shown, the magnetic head structures 510 and 520 include air bearing designs in which a 100 μm length at each end has been modified to slope 3.5° at the edge. In FIG. 5B, the profile of the magnetic head structure 510 is cylindrical over the entire beveled region. In FIG. 5C, the profile of the magnetic head structure 520 includes only a 30 μm cylindrical region, with the remaining 70 μm (horizontal) including a flat region. For these examples, a numerical model predicts a distance of closest approach of 0.4 microns for the design shown in FIG. 5B and 0.25 microns for the design shown in FIG. 5C, at 6 m/s. Of course, FIGS. 5A-5C are shown for exemplary purposes only and should not be construed as limiting in any manner.

It should be noted that, in some cases, changing the overall shape of the head to form an air bearing may not strongly affect stiction because the compliant tape may conform to the head shape. Thus, roughening may be utilized for reducing head-tape friction. However, in some situations, such roughening may increase tape wear. Additionally, the topography may be filled by tape debris or worn away by the tape.

Combining shaping and roughening may alleviate both running friction and stiction. The roughened surface reduces the real contact in the air bearing region such that there is very little stiction force from this area, even when the tape is starting from zero velocity. Further, because the tape lifts off this region as soon as the tape speed is appreciable, very little sliding contact occurs.

Figure 6A:
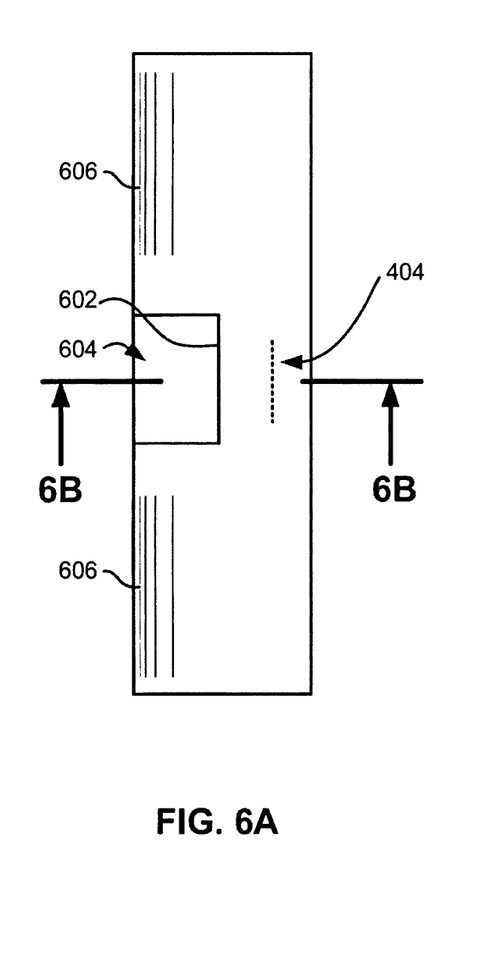
FIG. 6A shows a magnetic head structure, in accordance with one embodiment.
Figure 6B:
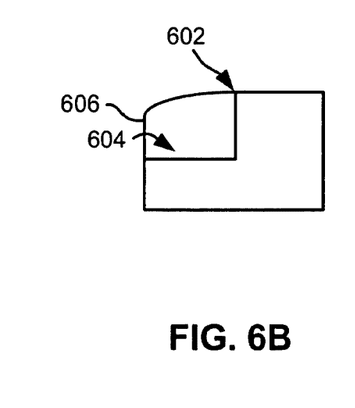
FIG. 6B is a cross sectional view taken from Line 6B of FIG. 6A.

FIGS. 6A and 6B illustrate another embodiment of a magnetic head structure 600, This embodiment includes a skiving edge 602 positioned above a slot 604 and outer portions 606 flanking the slot. The outer portions 606 behave similarly to the outer portions described above in other embodiments, and further may be shaped to define the wrap angle of the tape relative to the skiving edge 602.

Figure 7A:
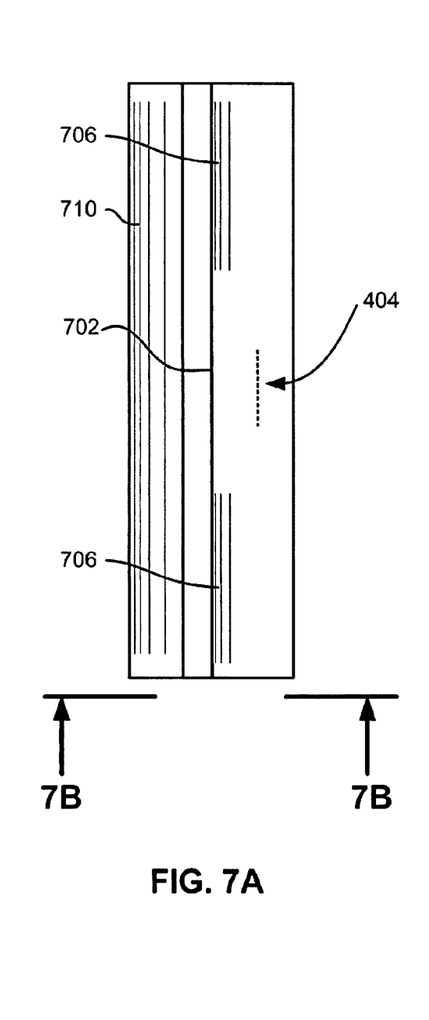
FIG. 7A shows a magnetic head structure, in accordance with one embodiment.
Figure 7B:
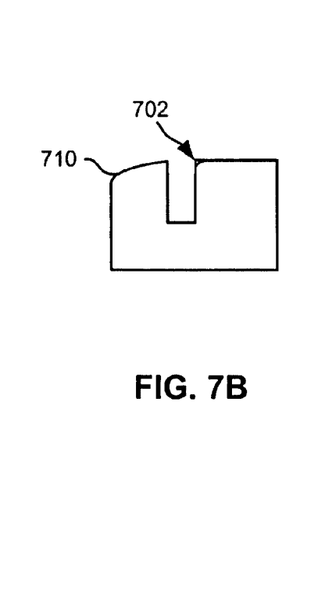
FIG. 7B is a side view taken from Line 7B of FIG. 7A.

FIGS. 7A and 7B illustrate another embodiment of a magnetic head structure 700. This embodiment includes a skiving edge 702 and outer portions 706 flanking the slot. The outer portions 706 behave similarly to the outer portions described above in other embodiments. Also included is an outrigger 710 that is shaped to define the wrap angle of the tape relative to the skiving edge 702.

Figure 8A:
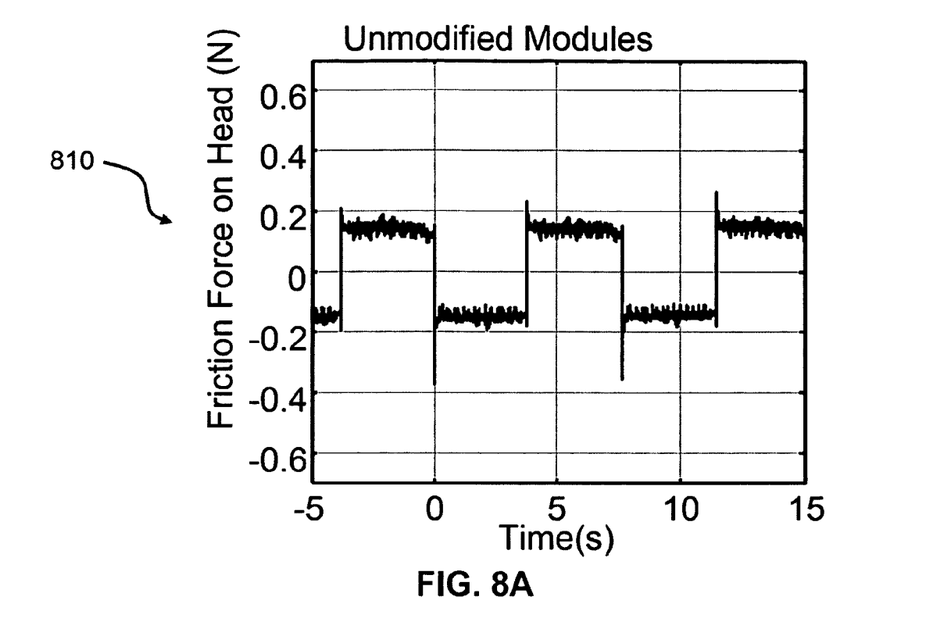
FIG. 8A is a chart presenting the friction of a smooth tape on a head having two flat modules.
Figure 8B:
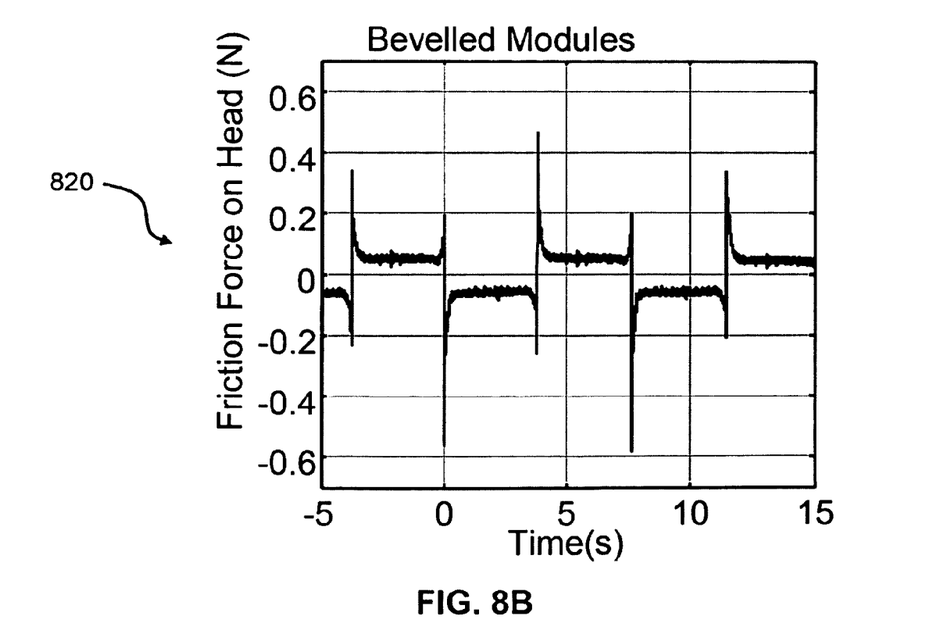
FIG. 8B is a chart presenting the friction of a smooth tape on a head having two modules modified in accordance with one embodiment.

FIG. 8A shows a chart 810 presenting the friction of a smooth tape, with an average surface roughness of Ra=2 nm, on a head of the type shown in FIG. 2 having two flat modules. FIG. 8B shows a chart 820 representing friction of the same tape on a head as used for FIG. 8A, but modified so that the ends of each module have a cross section approximately like that of FIG. 5C. The unmodified center of each module near the R/W elements is 4 mm in length. While recording the friction, the tape was moved alternately in forward and backward directions at a constant velocity of 4 m/s, decelerating and accelerating during reversal at 10 m/s$^2$. The relatively flat portions of the plots in FIGS. 8A and 8B represent time periods in which the tape is moving at a constant 4 m/s. The beveled head of FIG. 8B shows an average running friction of 0.055 N at 4 m/s, compared to 0.15 N for the unbevelled head of FIG. 8A. Furthermore, the frictional force of the beveled head shows much lower high frequency variation.

Figure 9A:
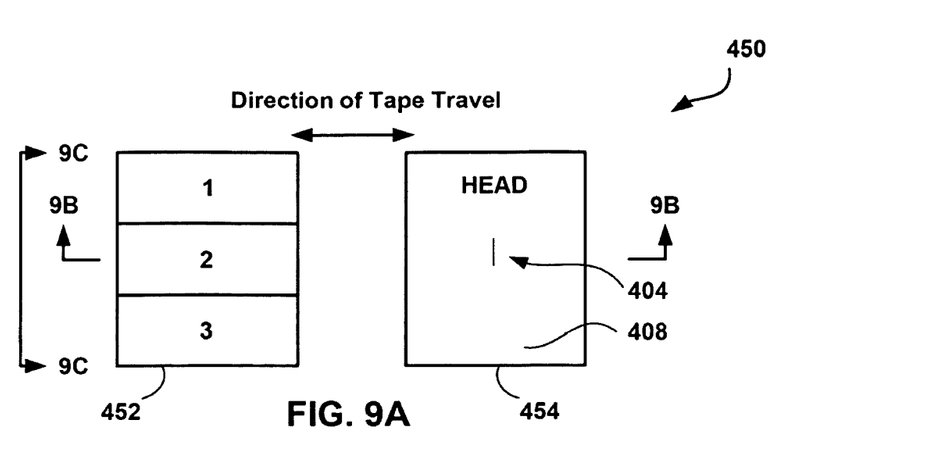
FIG. 9A shows a tape-based data storage system, in accordance with another embodiment.
Figure 9B:
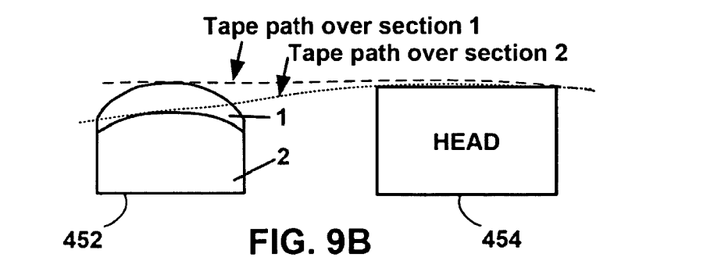
FIG. 9B is a cross sectional view taken along line 9B-9B of FIG. 9A.
Figure 9C:
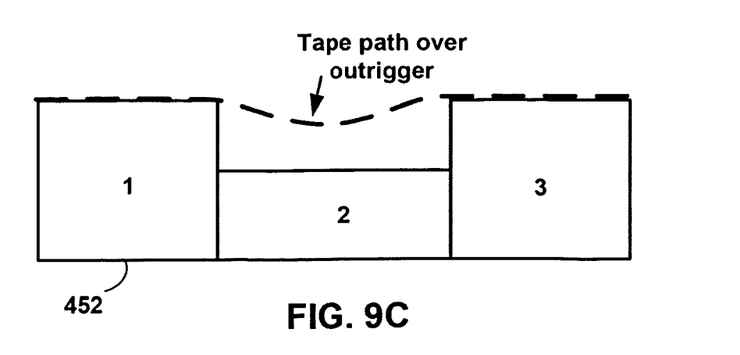
FIG. 9C is a side view taken along line 9C-9C of FIG. 9A.

In a further embodiment, an outrigger may induce the formation of an air bearing over portions of the tape bearing surface of the head away from the array of transducers. For example, FIGS. 9A-9C show a system 450 including an outrigger 452 and a transducer-containing portion 454, in accordance with one embodiment. The outrigger 452 has portions 1, 3 positioned relative to the tape bearing surface 408 of the transducer-containing portion 454 to induce a larger spacing between the tape and portions of the tape bearing surface 408 positioned laterally to the array 404 than between the tape and the contiguous portion of the tape bearing surface in front of or behind the array 404. This is achieved in part, by the lowered section 2 of the outrigger 452. Because the air bearings are induced by the outrigger 452, the entire leading edge of the head may include a skiving edge. The outrigger may be present on a unitary portion of the head, may be coupled to the transducer-containing portion, may be separately mounted relative to the transducer-containing portion, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a head having a tape bearing surface and an array of transducers in the tape bearing surface, the transducers being selected from a group consisting of readers, writers and servo readers, a length of the array being defined between outer transducers thereof;
the head having a feature that induces formation of a larger air bearing between a tape and portions of the tape bearing surface closest to a plane extending across tape-facing sides of the transducers and positioned laterally to the array in a direction about perpendicular to a direction of tape travel thereacross than between the tape and a contiguous portion of the tape bearing surface spanning a plurality of the transducers,
wherein the feature has a continuous length that is at least as long as the length of the array,
wherein the portions of the tape bearing surface positioned laterally to the array over which the air bearing is formed lie substantially along the plane extending across the tape-facing sides of the transducers,
wherein the portions of the tape bearing surface positioned laterally to the array over which the air bearing is formed are aligned with a longitudinal axis of the array defined along the length of the array.

2. A system as recited in claim 1, wherein the portions of the tape bearing surface positioned laterally to the array over which the air bearing is formed lie along the plane extending across the tape-facing sides of the transducers.

3. A system as recited in claim 1, wherein the feature lies along an edge of the tape bearing surface that extends about perpendicular to a direction of tape travel thereacross, the feature including a continuous skiving edge positioned in front of the array in a direction about parallel to the direction of tape travel thereacross.

4. A system as recited in claim 3, wherein the skiving edge has a length that is greater than about 75% of the array length.

5. A system as recited in claim 3, wherein outer portions of the edge of the tape bearing surface flanking the skiving edge have a shape adapted for inducing formation of an air bearing between the tape and the tape bearing surface therebehind.

6. A system as recited in claim 5, wherein the outer portions of the edge of the tape bearing surface have a rounded shape.

7. A system as recited in claim 5, wherein the outer portions of the edge of the tape bearing surface have a beveled shape.

8. A system as recited in claim 3, wherein the skiving edge promotes a contiguous area of contact between the tape and the array along a majority of a length of the array, the outer portions flanking the skiving edge and being aligned therewith in a direction parallel to a longitudinal axis of the array of transducers, wherein the areas of the tape bearing surface over which the air bearing is formed lie along the longitudinal axis of the array defined along the length of the array.

9. A tape head system as recited in claim 3, wherein the skiving edge has a continuous length that is greater than about 50% of the array length, portions of the edge of the tape bearing surface flanking the skiving edge in a direction about perpendicular to the direction of tape travel having a shape adapted for inducing an air bearing between the tape and the tape bearing surface over areas of the tape bearing surface adjacent thereto.

10. A system as recited in claim 1, wherein the portions of the tape bearing surface positioned laterally to the array are rough.

11. A system as recited in claim 1, wherein the feature includes an outrigger having portions positioned relative to the tape bearing surface to induce the larger spacing between the tape and portions of the tape bearing surface positioned laterally to the array than between the tape and the contiguous portion of the tape bearing surface in front of or behind the array.

12. A system as recited in claim 1, wherein the contiguous portion extends beyond the length of the array.

13. A system as recited in claim 1, wherein the tape bearing surface is predominantly planar.

14. A system as recited in claim 1, wherein the tape bearing surface is predominantly rounded.

15. A system as recited in claim 1, wherein no air bearing is formed over a majority of the array.

16. A system as recited in claim 1, further comprising:
a drive mechanism for passing a magnetic medium over the head; and
a controller electrically coupled to the head.

17. A method, comprising:
passing a magnetic tape across a head;
inducing formation of a larger spacing between the tape and portions of a tape bearing surface of the head positioned closest to the tape and positioned laterally to an array of transducers in a direction about perpendicular to a direction of tape travelh thereacross than between the tape and a contiguous portion of the tape bearing surface spanning a plurality of the transducers,
wherein the portions of the tape bearing surface positioned laterally to the array over which the air bearing is formed lie substantially along the plane extending across the tape-facing sides of the transducers,
wherein the portions of the tape bearing surface positioned laterally to the array over which the air bearing is formed are aligned with a longitudinal axis of the array defined along the length of the array.

18. A method as recited in claim 17, wherein inducing formation of the larger spacing further comprises promoting formation of an air bearing between the tape and the portions of the tape bearing surface of the head positioned laterally to, and aligned with a longitudinal axis of, the array of transducers in a direction about perpendicular to the direction of tape travel.

* * * * *